(12) United States Patent
Graf et al.

(10) Patent No.: US 10,511,240 B2
(45) Date of Patent: Dec. 17, 2019

(54) APPARATUS AND METHOD FOR CONTROLLING A FLUID PUMP FOR A MOTOR VEHICLE

(71) Applicant: Continental Automotive GmbH, Hannover (DE)

(72) Inventors: Rolf Graf, Glashütten (DE); Klaus Kronenberg, Sulzbach (DE)

(73) Assignee: Continental Automotive GmbH, Hannover (DE)

( * ) Notice: Subject to any disclaimer, the term of this patent is extended or adjusted under 35 U.S.C. 154(b) by 2 days.

(21) Appl. No.: 15/522,533

(22) PCT Filed: Oct. 21, 2015

(86) PCT No.: PCT/EP2015/074404
§ 371 (c)(1),
(2) Date: Apr. 27, 2017

(87) PCT Pub. No.: WO2016/066502
PCT Pub. Date: May 6, 2016

(65) Prior Publication Data
US 2017/0338758 A1 Nov. 23, 2017

(30) Foreign Application Priority Data
Oct. 31, 2014 (DE) .......... 10 2014 222 338

(51) Int. Cl.
H02P 7/28 (2016.01)
F02M 37/08 (2006.01)
F04D 13/06 (2006.01)
F04D 15/00 (2006.01)

(52) U.S. Cl.
CPC .......... *H02P 7/2805* (2013.01); *F02M 37/08* (2013.01); *F04D 13/06* (2013.01); *F04D 15/0066* (2013.01); *F02M 2037/085* (2013.01)

(58) Field of Classification Search
USPC .......................................... 318/461
See application file for complete search history.

(56) References Cited

U.S. PATENT DOCUMENTS

| 4,451,112 A | * | 5/1984 | Hattori | H02P 1/30 318/778 |
| 7,042,194 B1 | * | 5/2006 | Kuroiwa | H02P 6/00 318/811 |
| 2004/0081438 A1 | * | 4/2004 | Hahn | H02P 6/28 388/804 |
| 2005/0007061 A1 | * | 1/2005 | Hofmann | H02P 9/30 318/701 |
| 2014/0271235 A1 | | 9/2014 | Magyar | |
| 2017/0338758 A1 | * | 11/2017 | Graf | F04D 13/06 |

FOREIGN PATENT DOCUMENTS

| CN | 1767355 | 5/2006 |
| CN | 102577093 | 7/2012 |

* cited by examiner

Primary Examiner — Jorge L Carrasquillo
(74) Attorney, Agent, or Firm — Cozen O'Connor

(57) ABSTRACT

An apparatus for controlling a fluid pump for a motor vehicle includes: a first controller configured to actuate an electric prime mover of the fluid pump by impressing at least one motor current with an adapted current intensity and an adapted waveform; and a second controller configured to detect a rotational speed of the electric prime mover and to apply an adapted voltage to the electric prime mover on the basis of the detected rotational speed.

6 Claims, 4 Drawing Sheets

APPARATUS AND METHOD FOR CONTROLLING A FLUID PUMP FOR A MOTOR VEHICLE

CROSS-REFERENCE TO RELATED APPLICATIONS

This is a U.S. national stage of application No. PCT/EP2015/074404, filed on 21 Oct. 2015, which claims priority to the German Application No. 10 2014 222 338.5 filed 31 Oct. 2014, the content of both incorporated herein by reference.

BACKGROUND OF THE INVENTION

1. Field of the Invention

The present invention relates to apparatuses and methods for controlling a fluid pump for a motor vehicle. In particular, the present invention relates to an apparatus and to a method for controlling a fuel pump for a motor vehicle.

2. Related Art

Modern fluid pumps for motor vehicles use drive motors according to the EC principle, "EC" is here an abbreviation for the term "electronically commutated".

These drive motors according to the EC principle comprise the principle of a permanently excited synchronous machine and can be operated over a specific rotational speed range. For reasons of the associated production costs and reliability, in the field of motor vehicles these motors are operated in fluid pumps without position sensors.

This is possible because the electronics that are necessary for operation are able to detect the back EMF, an abbreviation for electromotive force, in other words the induction voltage, of the free-wheeling phase and use it as a position signal of the rotor. However, this method for determining the position of the rotor is restricted to a certain minimum rotational speed. Below this rotational speed it is not possible to detect a viable useful signal. The rotational speed range of the fluid pump is therefore restricted in the downward direction.

Fluid pumps for motor vehicles are manufactured in different variants for engines that are operated with gasoline and engines that are operated with diesel. For engines operated with gasoline, flow pump units are used as fluid pumps. For engines operated with diesel, expeller pump units are used as the fluid pump, typically according to the gyrator principle, screw principle or roller cell principle. The pump units according to the expeller principle usually have a high degree of hydraulic-mechanical rigidity compared to the flow pump units. This gives rise to a pronounced increase in pressure if there is inequality between the delivered quantity and the extracted quantity in a fuel system.

The increase in pressure results in a pronounced increase in the torque necessary to operate the pump unit and also in a corresponding flow of the driving electric machine.

Conventional fuel systems in a motor vehicle or passenger car are equipped with various internal consumers, for example suction jet pumps. These give rise to a minimum extraction of fuel.

SUMMARY OF THE INVENTION

An object of the present invention is to make available an improved control apparatus and an improved control method for fuel pumps which are used in a motor vehicle.

A first aspect of the present invention relates to an apparatus for controlling a fluid pump for a motor vehicle, wherein the apparatus comprises a first controller configured to actuate an electric prime mover of the fluid pump by impressing at least one motor current with an adapted current intensity and an adapted waveform; and a second controller configured to detect a rotational speed of the electric prime mover and to apply an adapted voltage to the electric prime mover on the basis of the detected rotational speed.

The present invention, according to one aspect, relates to a fluid pump for a motor vehicles wherein the fluid pump can be embodied as a fuel pump, water pump or oil pump or as some other pump for a liquid or a fluid.

According to a further, second aspect of the present invention, a fluid pump is provided for a motor vehicle, wherein the fluid pump comprises an apparatus according to the first aspect or according to any desired embodiment of the first aspect.

According to a further, third aspect of the present invention, a method for controlling a fluid pump for a motor vehicle is provided, wherein the method comprises: detecting (S1) a rotational speed of the electric prime mover (110) and comparing the detected rotational speed with a rotational speed threshold value for the electric prime mover (110); impressing (S2) at least one motor current with an adapted current intensity and an adapted waveform into the electric prime mover (110) if the detected rotational speed of the electric prime mover (110) is below the rotational speed threshold value for the electric prime mover (110); and applying (S3) an adapted voltage to the electric prime mover (110) if the detected rotational speed of the electric prime mover (110) is above the rotational speed threshold value for the electric prime mover (110).

The present invention advantageously makes it possible for the pump current to be monitored and, if appropriate, limited with the power electronics or controllers which are necessary in any case for operating a fluid pump operated according to the EC principle, and in addition these power electronics are also used to actuate the fluid pump.

If such electronics or controllers are intended to operate the fluid pump below a minimum rotational speed limit, the present invention can advantageously use this property—the limitation and monitoring—to actuate the fluid pump.

The electronics or power electronics in the form of a controller operate the fluid pump by rotational speed control in the operating case that is customary today. In this context, the voltage applied to the motor is continuously influenced, in order to achieve a specific predefined rotational speed independently of the hydraulic state at the pump unit.

If there is a need for a corresponding rotational speed that is reduced in comparison therewith, in this case a changed operating behavior of the pump is activated below the predetermined rotational speed limiting value or rotational speed threshold value.

In other words, a second controller or an alternative control method can be used, and, for example, depending on the rotational speed, between different controllers or an alternative control method.

The electronics then no longer operate the pump by applying a voltage to the winding sections of the electric motor but rather by impressing currents with suitable magnitude and with suitable waveforms. The field frequency of the actuation is kept at a predefined value. By impressing a current with a suitable magnitude it is possible to forcibly bring about a following by the pump rotor.

In addition, as the rotational frequency of the field rises, increasing acceleration for a stationary rotor can be made possible, that is to say the impressed current can be adapted to the field rotational speed.

This can mean for low rotational speeds, that is to say those below the rotational speed threshold, that the system operates with a lower impressed current than in the case of relatively high rotational speeds.

In addition, the present invention advantageously permits the heating of the fluid pump and of the fuel to be limited at very low rotational speeds and with corresponding through-flow rates.

In one advantageous embodiment of the present invention there is provision that the apparatus is configured to compare the detected rotational speed of the electric prime mover with a rotational speed threshold value for the electric prime mover.

In one advantageous embodiment of the present invention there is provision that the apparatus is configured to use the first controller to actuate the electric prime mover if the detected rotational speed of the electric prime mover is below the rotational speed threshold value for the electric prime mover.

In a further advantageous embodiment of the present invention there is provision, that the apparatus is configured to use the second controller to actuate the electric prime mover if the detected rotational speed of the electric prime mover is above the rotational speed threshold value for the electric prime mover.

In a further advantageous embodiment of the present invention there is provision that the first controller is configured to actuate the art least one motor current with the adapted waveform in accordance with a predefined field frequency.

In a further advantageous embodiment of the present invention there is provision that the first controller is configured to read out the field frequency from a characteristic curve diagram.

In a further advantageous embodiment of the present invention there is provision that the first controller is configured to determine the field frequency using a gradient calculation.

In a further advantageous embodiment there is provision that the first controller is configured to determine the gradient calculation taking into account a mass moment of inertia of a rotor of the electric prime mover.

In a further advantageous embodiment there is provision that the fluid pump is a water pump or a fuel pump or an oil pump or a pump with an electric prime mover in the form of a synchronous machine with a permanent magnet.

The fluid pump can advantageously be used here in a motor vehicle, for example as a fuel pump.

The described refinements and developments can be combined with one another as desired.

Further possible refinements, developments and implementations of the present invention also comprise non-explicitly specified combinations of features of the invention which have been described above or below with respect to the exemplary embodiments.

BRIEF DESCRIPTION OF THE DRAWINGS

The appended drawings are intended to permit better understanding of the embodiments of the present invention. The appended drawings illustrate embodiments and serve to clarify concepts of the invention in conjunction with the description.

Other embodiments and many of the specified advantages arise in view of the drawings. The illustrated elements of the drawings are not necessarily shown, true to scale with respect to one another. In the drawings.

DETAILED DESCRIPTION OF THE PRESENTLY PREFERRED EMBODIMENTS

In the figures of the drawings, identical reference symbols denote identical or functionally identical elements, parts, components or method steps, unless stated otherwise.

Figure 1:
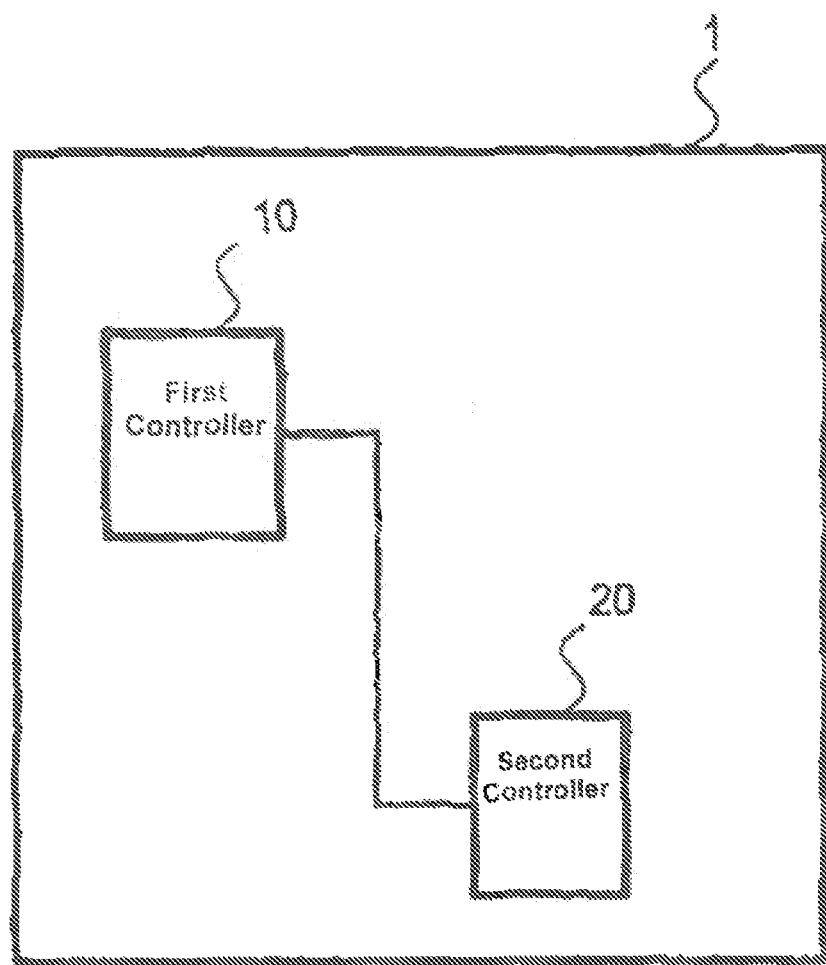
FIG. 1 shows a schematic illustration of an apparatus for controlling a fluid pump for a motor vehicle according to an embodiment of the present invention.

FIG. 1 shows a schematic illustration of an apparatus for controlling a fluid pump for a motor vehicle.

The apparatus 1 comprises, for example, a first controller 10 and a second controller 20.

The first controller is configured, for example, to actuate an electric prime mover 110 of the fluid pump 100 by impressing at least one motor current with an adapted current intensity and an adapted waveform.

The second controller is configured, for example, to detect a rotational speed of the electric prime mover and to apply an adapted voltage to the electric prime mover on the basis of the detected rotational speed.

Figure 2:
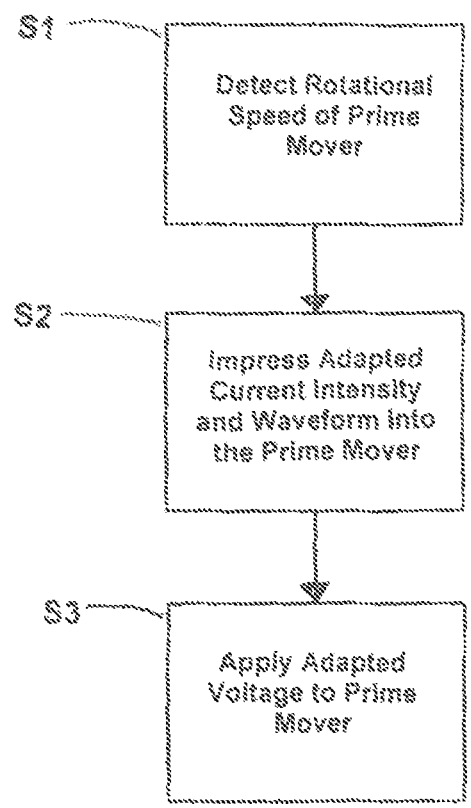
FIG. 2 shows a schematic illustration of a flow chart for controlling a fluid pump for a motor vehicle according to a further embodiment of the present invention.

FIG. 2 shows a schematic illustration of a flow chart for controlling a fluid pump for a motor vehicle according to a further embodiment of the present invention.

The method for controlling the fluid pump 100 (see FIG. 3) for a motor vehicle 2 comprises the following steps here:

As a first step of the method, for example a rotational speed of the electric prime mover 110 (see FIG. 3) is detected (S1), and the detected rotational speed is compared, which a rotational speed threshold value for the electric prime mover 110.

As a second step of the method, for example at least one motor current with an adapted current intensity and an adapted waveform is impressed (S2) into the electric prime mover 110 if the detected rotational speed of the electric prime mover 110 is below the rotational speed threshold value for the electric prime mover 110.

As a third step of the method, for example an adapted voltage is applied (S3) to the electric prime mover 110 on the basis of the detected rotational speed if the detected rotational speed of the electric prime mover 110 is above the rotational speed threshold value for the electric prime mover.

Figure 3:
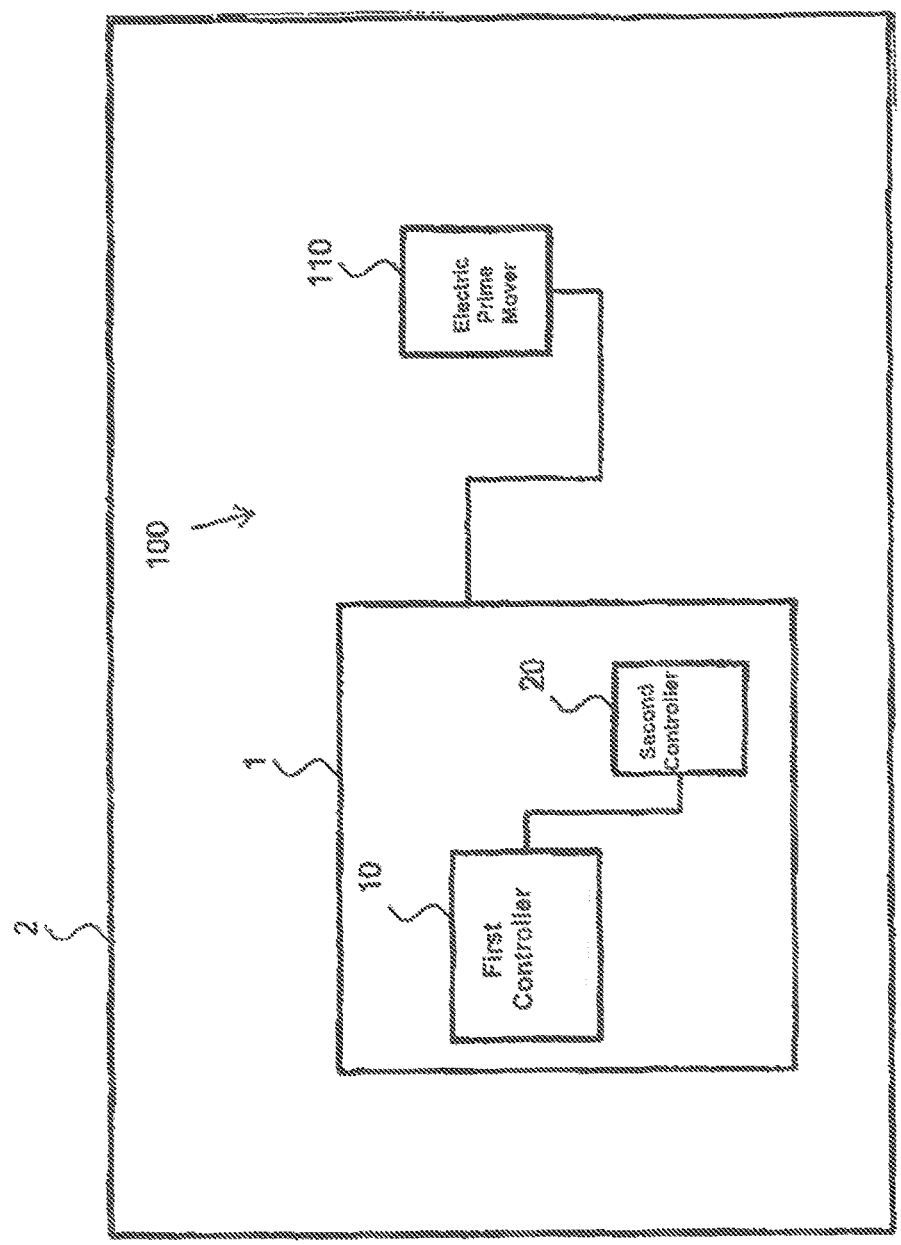
FIG. 3 shows a schematic illustration of a fluid pump for a motor vehicle according to a further advantageous embodiment of the present invention.

FIG. 3 shows a schematic illustration of a fluid pump according to a further embodiment of the present invention.

A fluid pump 100 for a motor vehicle 2 comprises, for example, an apparatus 1 as pump control electronics and an electric prime mover 110.

Figure 4:
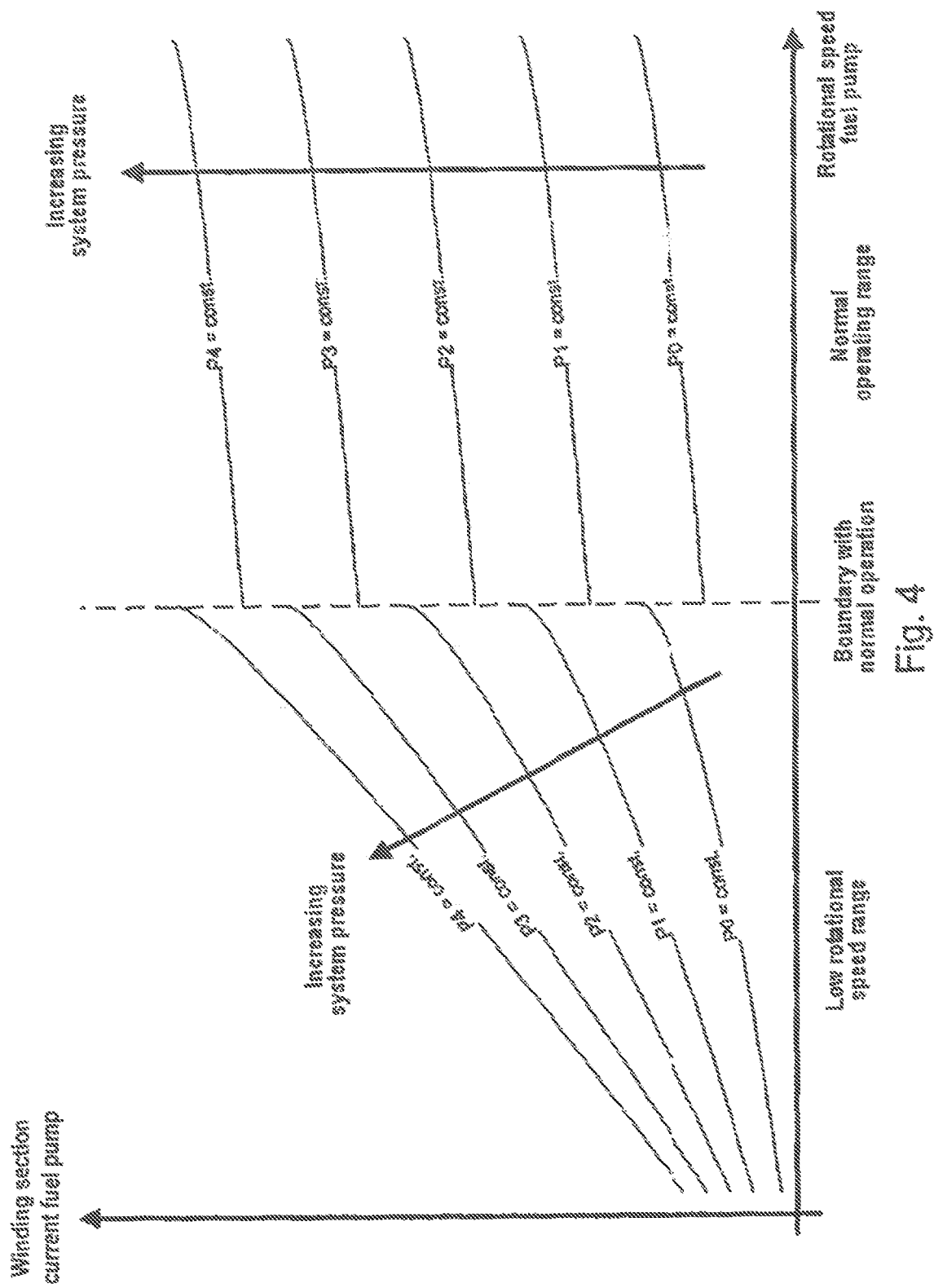
FIG. 4 shows a schematic illustration of a diagram illustrating the winding section current of a fluid pump over a specific rotational speed range of the fluid pump in order to clarify the present invention.

FIG. 4 shows a schematic illustration of a diagram in order to clarify the invention.

For example a rotational speed of a fluid pump is recorded on the X axis of the diagram.

For example the winding section current of the fluid pump is plotted on the Y axis of the diagram.

The characteristic curves or current curves for different pressures P0 to P4 illustrated in FIG. 4 result in a characteristic curve diagram.

The indicated arrow in the diagram represents the direction of the increasing system pressure.

A dashed line parallel to the y axis represents a boundary with the normal operation. In other words, this is a rotational speed threshold value for the electric prime mover 110, and, for example, the boundary between the low rotational speed range and the normal operation of the fluid pump is at a rotational speed of the electric prime mover 110 of the fluid pump of 100 rpm or 500 rpm or 1000 rpm or 2000 rpm.

The boundary with the normal operation therefore differentiates a low rotational speed range from a normal operating range of the fluid pump with respect to its rotational speed.

FIG. 4 shows a winding section current/rotational speed diagram with current boundaries of the winding section current for low rotational speed ranges and normal operating ranges, and in the low rotational speed range the curves correspond to the impressed current or winding section current at predetermined pressures P0 to P4.

FIG. 4 represents an adapted current intensity, wherein the controllers can also use an adapted waveform for the motor current, for example a sine form or a ramp form.

In the normal operating range or normal rotational speed range, the winding section current is substantially lower at respectively identical pressures P0 to P4. However, the pump drive current or the fluid pressure, or in the case of a fuel pump the fuel pressure, can also be correspondingly limited during normal operation if specific rotational-speed-dependent values are reached.

Although the present invention has been described above with reference to preferred exemplary embodiments, it is not restricted thereto but rather can be modified in a variety of ways. In particular, the invention can be changed or modified in various ways without departing from the core of the present invention.

In addition, it is to be noted that "comprising" and "having" do not exclude other elements or steps, and "a" or "an" does not exclude a plurality.

In addition it is to be noted that features or steps which have been described with reference to one of the above exemplary embodiments can also be used in combination with other features or steps of other exemplary embodiments described above. Reference symbols in the claims are not to be considered as restrictions.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus (1) for controlling a fluid pump (100) for a motor vehicle (2), the apparatus comprising:
    a back EMF (electromotive force) detector configured to return position information relating an electric prime mover (110) of the fluid pump (100), wherein the electric prime mover (110) is an Electronically Commutated (EC) motor;
    a first controller (10) configured to actuate the electric prime mover (110) of the fluid pump (100) by impressing at least one motor current with an adapted current intensity and an adapted waveform; and
    a second controller (20) configured to detect, based on position information of the back EMF detector, a rotational speed of the electric prime mover (110) and to apply an adapted voltage to the electric prime mover (110) if a rotational speed can be detected based on the back EMF,
    wherein the apparatus (1) is configured to compare the detected rotational speed of the electric prime mover (110) with a rotational speed threshold value for the electric prime mover (110),
    wherein the apparatus (1) is configured to use the first controller (10) to actuate the electric prime mover (110) by impressing on the motor the at least one motor current with the adapted current intensity and the adapted waveform if the detected rotational speed of the electric prime mover (110) is determined to be below the rotational speed threshold value for the electric prime mover (110) based on a failure of the back EMF detector to return position information, and
    wherein the apparatus (1) is configured to use the second controller (20) to actuate the electric prime mover (110) by applying an adapted voltage to the electric prime mover (110) on the basis of the detected rotational speed if the detected rotational speed of the electric prime mover (110) is above the rotational speed threshold value for the electric prime mover (110).

2. The apparatus as claimed in claim 1, wherein the first controller (10) is configured to actuate the at least one motor current with the adapted waveform in accordance with a predefined field frequency.

3. The apparatus as claimed in claim 2, wherein the first controller (10) is configured to read out the field frequency from a characteristic curve diagram, and/or the first controller (10) is configured to determine the field frequency using a gradient calculation.

4. The apparatus as claimed in claim 3, wherein the first controller (10) is configured to determine the gradient calculation taking into account a mass moment of inertia of a rotor of the electric prime mover (110).

5. A fluid pump (100) for a motor vehicle (2), wherein the fluid pump (100) comprises an apparatus (1) as claimed in claim 1.

6. The fluid pump (100) as claimed in claim 5, wherein the fluid pump (100) is a water pump or a fuel pump or an oil pump or a pump with an electric prime mover (110) configured as a synchronous machine with a permanent magnet.

* * * * *